US012545215B2

(12) United States Patent
Jacobs et al.

(10) Patent No.: US 12,545,215 B2
(45) Date of Patent: Feb. 10, 2026

(54) PENDULUM ROCKER BRUSH ASSEMBLY FOR A VEHICLE WASH SYSTEM

(71) Applicant: Tommy Enterprises, Inc., Holland, MI (US)

(72) Inventors: Austin N. Jacobs, Allendale, MI (US); Ryan Essenburg, Holland, MI (US); Dirk Deckinga, Walker, MI (US)

(73) Assignee: Tommy Enterprises, Inc., Holland, MI (US)

(*) Notice: Subject to any disclaimer, the term of this patent is extended or adjusted under 35 U.S.C. 154(b) by 351 days.

(21) Appl. No.: 18/214,087

(22) Filed: Jun. 26, 2023

(65) Prior Publication Data
US 2023/0331196 A1    Oct. 19, 2023

Related U.S. Application Data

(63) Continuation-in-part of application No. 17/532,355, filed on Nov. 22, 2021, now abandoned.

(51) Int. Cl.
*B60S 3/06* (2006.01)
*A46B 13/00* (2006.01)
(Continued)

(52) U.S. Cl.
CPC ............ *B60S 3/063* (2013.01); *A46B 13/005* (2013.01); *A46B 13/02* (2013.01); *F16D 9/06* (2013.01); *A46B 2200/3046* (2013.01)

(58) Field of Classification Search
CPC .......... A46B 2200/3046; A46B 13/005; A46B 13/02; B60S 3/063; B60S 3/06; B60S 3/042; F16D 9/06
(Continued)

(56) References Cited

U.S. PATENT DOCUMENTS 3,523,320 A * 8/1970 Williams ................ B60S 3/063
                                                                15/53.3
3,662,417 A * 5/1972 Fuhring .................. B60S 3/042
                                                                15/53.4
(Continued)

FOREIGN PATENT DOCUMENTS

| CN | 106794824 A | * | 5/2017 | .............. B60S 3/004 |
| DE | 102006017999 B4 | | 11/2007 | |
| KR | 100829416 B1 | * | 5/2008 | .............. B60S 3/004 |

OTHER PUBLICATIONS

CN 106794824 Espacenet Translation; Vehicle Washing Facility and Method for Operating The Same; Auer, Robert; May 31, 2017 (Year: 2017).*
(Continued)

*Primary Examiner* — Brian D Keller
*Assistant Examiner* — Sidney D Full
(74) *Attorney, Agent, or Firm* — Warner Norcross + Judd LLP

(57) ABSTRACT

A pendulum rocker brush for a vehicle wash system is provided including a rocker arm, a rotatable coupler, a motor assembly, and a rocker brush head. Both the rocker brush head and motor assembly can be suspended from the coupler, freely dangling therefrom under the force of gravity, in an unbiased manner. The rocker brush head can pivot relative to the rocker arm through a swing angle between 5 and 45 degrees relative to vertical. The rotatable coupler and rocker brush head can be disposed at a pivoting angle between 10 and 45 degrees relative to a conveyor direction which a vehicle follows. When the rocker brush head encounters an opposing force above a movement threshold from the vehicle, the rocker brush head and the motor assembly can swing outward to the swing angle and at the pivoting angle so the vehicle is not damaged.

20 Claims, 12 Drawing Sheets

(51) Int. Cl.
*A46B 13/02* (2006.01)
*F16D 9/06* (2006.01)

(58) Field of Classification Search
USPC ........... 15/53.1, 53.2, 53.3, 53.4, 55, DIG. 2
See application file for complete search history.

(56) References Cited

U.S. PATENT DOCUMENTS

| | | | | |
|---|---|---|---|---|
| 4,225,995 | A * | 10/1980 | Ennis | B60S 3/063 |
| | | | | 15/DIG. 2 |
| 4,306,325 | A * | 12/1981 | Pyle | B60S 3/06 |
| | | | | 15/53.2 |
| 5,715,558 | A * | 2/1998 | Johnson | B60S 3/063 |
| | | | | 15/53.2 |
| 6,835,140 | B2 * | 12/2004 | Fazio | B60S 3/063 |
| | | | | 464/134 |
| D514,755 | S | 2/2006 | Essenburg | |
| 10,226,027 | B2 * | 3/2019 | Kultanen | A01K 13/004 |
| 10,994,705 | B2 | 5/2021 | Auer et al. | |

OTHER PUBLICATIONS

KR 100829416 Espacenet Translation; Tilting Steering Apparatus for Side Brush of Car Washing Machine; Han Jin Mi; May 15, 2008 (Year: 2008).*

* cited by examiner

PENDULUM ROCKER BRUSH ASSEMBLY FOR A VEHICLE WASH SYSTEM

BACKGROUND OF THE INVENTION

The present invention relates to rocker brush assemblies for use in a vehicle wash system, and more particularly, to a pendulum rocker brush assembly.

Automatic vehicle wash systems are implemented in most car washes. An automatic car wash includes a structure through which a vehicle is moved through to be cleaned. Many automatic car washes include a conveyor belt system that engages one or more wheels of the vehicle to guide, push and/or pull the vehicle through the structure. Most automatic car washes also include multiple different brushes and drums having cloth or fiber elements that move or rotate relative to a vehicle while engaging it to perform different actions on different parts of the vehicle.

One type of brush used in a car wash is a rocker brush. A rocker brush is used to clean the rocker panels and generally lower parts of a vehicle. Rocker brushes have a rocker brush head that includes flexible bristles that hang substantially vertically from a vertically disposed shaft until the rocker brush head and shaft are rotated. The rocker brush and its shaft typically are rotatably mounted on a stand anchored to the ground near a conveyor of a car wash. When the rocker brush head is actuated, it spins and the flexible bristles transition from a substantially vertical position to a substantially horizontal position due to centrifugal forces. Typical rocker brushes can damage the vehicle if the brush exerts too much force on the vehicle than is intended during normal operation. For example, if the vehicle is positioned too close to the brush, more of the brush can come in contact with the vehicle, or the brush can push too hard against the vehicle. As a result, the rocker brush can exert more force on the vehicle and damage the vehicle by denting or scratching its body panels. Alternatively, the rocker brush can scratch the surfaces of the vehicle with excess force exerted by the brush on those surfaces, particularly if there is dirt or debris matted or embedded in the brush.

Most conventional rocker brushes use gas shocks or springs, mounted between the stand and the vertical shaft, to allow the vertical shaft and rocker brush to move, while the shaft is retained in the vertical position, away from the vehicle to avoid damaging the vehicle. This requires maintenance, as the shocks and springs usually need to be carefully and repeatedly adjusted to provide appropriate forces against washed vehicles to avoid damage to the same. The shocks and springs also can wear out, and thus will need to be replaced. Further, any bearings in the rocker brush assembly associated with the movement need to be frequently monitored and greased during the lifetime of the rocker brush assembly to ensure that proper function is maintained. Some rocker brush assemblies also use rubber bumpers to keep the rocker brush a certain distance from the vehicle, to avoid damaging it. These rubber bumpers require maintenance and need to be replaced, adding further expense to the operation of the rocker assemblies.

Accordingly, there remains room for improvement in the field of rocker brush assemblies to reduce maintenance and yet still provide a solid rocker brush that can clean vehicles without damaging them.

SUMMARY OF THE INVENTION

A rocker brush assembly is provided where the rocker brush includes a pendulum-style mount which enables the rocker brush to freely swing, without the aid of external components, relative to a vehicle pathway and/or a surface of a vehicle engaged by the rocker brush, thereby providing good treatment of the vehicle surface and reducing the likelihood of damage thereto.

In one embodiment, the pendulum rocker brush assembly can include a rocker arm with a first length. The rocker arm can be fixedly attached to a structure of a car wash at a first end through a first coupler. A coupling projection can extend from and be joined with the rocker arm adjacent a second end of the rocker arm.

In another embodiment, a pivot bushing can define an aperture and a coupling surface. The aperture of the pivot bushing can be joined with the coupling projection.

In still another embodiment, a motor assembly can include a motor and a motor shroud. The motor can include a motor body and a motor shaft. The motor shroud can surround the motor body with the motor shaft extending outside the motor shroud. A top surface of the motor shroud can be joined with the coupling surface of the pivot bushing.

In yet another embodiment, a rocker brush head can include a central support member and multiple flexible bristles. The central support member can define a support aperture and the rocker brush can be joined with the motor shaft through the support aperture. The bristles can be attached at one end to an outer surface of the central support member. The bristles can be spaced evenly across the outer surface of the central support member.

In even another embodiment, the motor can rotatably actuate the rocker brush head when the motor is turned on. The flexible bristles can move from a first position to a second position when the rocker brush head is rotatably actuated. The rocker brush head and the motor assembly can be configured to pivot about the pivot bushing away from a vehicle pathway when the rocker brush head encounters an opposing force above a movement threshold.

In a further embodiment, a coupling projection can extend perpendicularly from the rocker arm adjacent a second end of the rocker arm. A rotatable coupler can define an aperture and a coupling surface. The coupling projection can be movably joined with the aperture of the rotatable coupler. A top surface of a motor shroud can be joined with the coupling surface of the rotatable coupler. A rocker brush head can be joined with a motor shaft. A motor can actuate the rocker brush head when the motor is turned on.

In still a further embodiment, both the rocker brush head and motor assembly can be suspended from the rotatable coupler, freely dangling therefrom under the force of gravity, in an unbiased manner.

In yet a further embodiment, the rocker brush head can pivot relative to the rocker arm through a swing angle between 10 and 45 degrees relative to vertical.

In even a further embodiment, the rotatable coupler and rocker brush head can be disposed at a pivoting angle between 10 degrees and 45 degrees, inclusive, or between 10 degrees and 20 degrees, inclusive, relative to a conveyor direction which a vehicle follows. Optionally, when the rocker brush head encounters an opposing force above a movement threshold from the vehicle, the rocker brush head and the motor assembly can swing outward to the swing angle and at the pivoting angle so the vehicle is not damaged.

The current embodiments of the pendulum rocker brush assembly provides efficiencies and ease of use not attainable with previous rocker panel brushes. For example, the rocker brush is freely suspended and swings like a pendulum to closely but safely follow contours of a vehicle moving along a vehicle pathway during a wash operation. The rocker brush assembly can be primarily maintenance free, as opposed to prior rocker brushes. For example, there can be no bearings to lubricate and no gas shocks or springs to replace or service in the swinging mechanism of the assembly. Further, with the simplified action of the pendulum rocker brush assembly, no complicated adjustments need be made for the assembly to work properly, and there is not a special angle at which to set the central support, because that shaft can move from a vertical orientation and swing to some other orientation offset from vertical, dynamically changing to accommodate the contours of the passing vehicle that engages the bristles on the rocker brush assembly. Further, with its ability to freely move and avoid damage to the vehicle surfaces, the assembly need not have any additional rubber bumpers to protect the vehicle.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention can be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration can be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
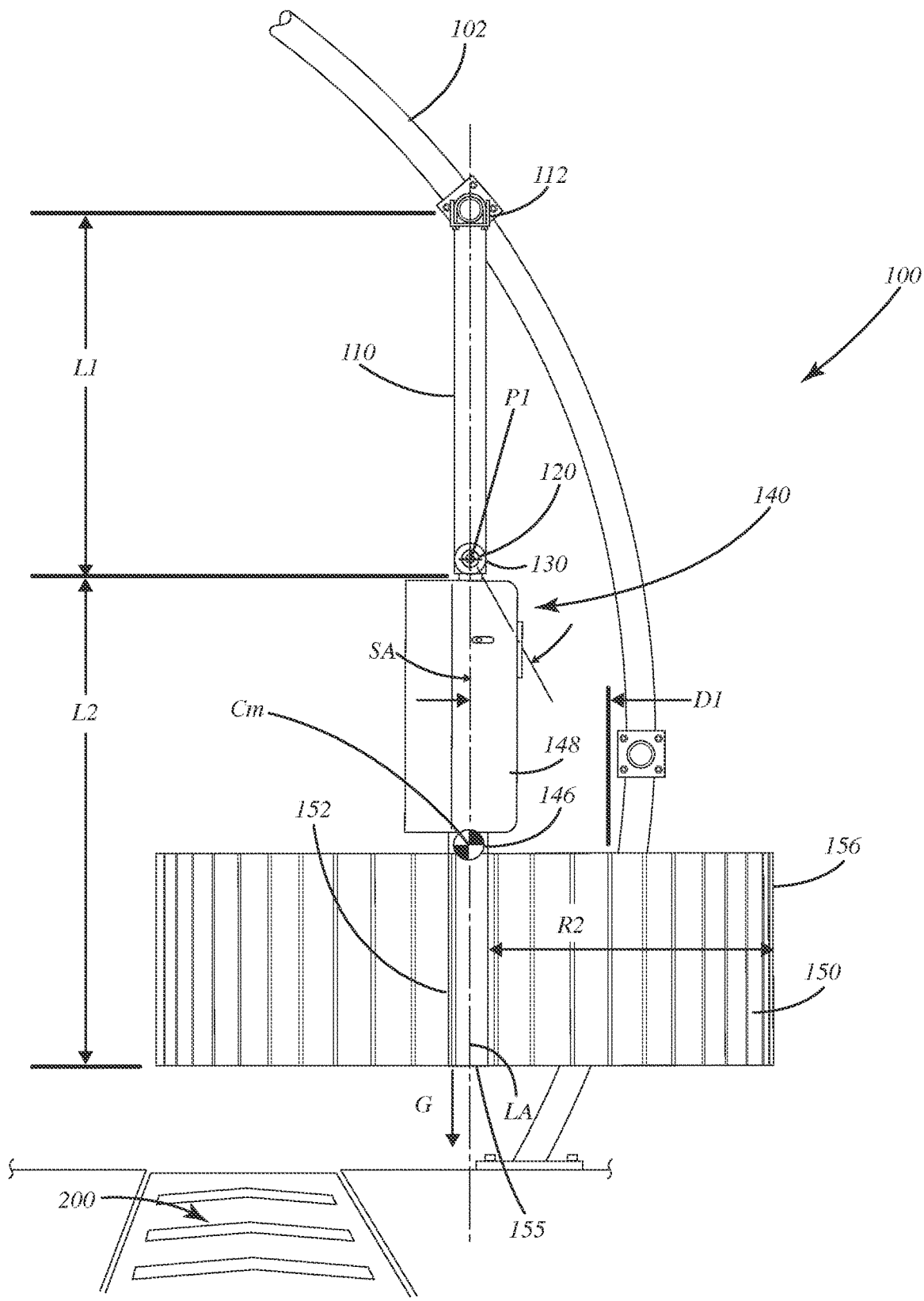
FIG. 1 is a front view of a pendulum rocker brush assembly as installed in a car wash and in motion according to one embodiment.

A pendulum rocker brush assembly according to a current embodiment is shown in FIGS. 1-7 and generally designated 100. As shown in FIG. 1, the pendulum rocker brush assembly 100 can include a rocker arm 110. The rocker arm 110 can be fixedly attached to a car wash structure or support structure 102 via a first coupler 112, which optionally can include one or more U-bolts joined with a plate, and which can form part of the support structure. After securement to the support structure 102, which can be in the form of an arch or frame extending over an underlying vehicle pathway 200, the pendulum rocker brush assembly 100 can be moved with respect to the car wash structure 102 until it is in the appropriate location and then the rocker arm 110 can be fixedly and immovably (but adjustably) attached to the car wash structure 102. The rocker arm 110 can have a first length L1, which can be optionally between 5 and 60 inches, inclusive, between 5 and 40 inches, inclusive, between 20 and 40 inches, inclusive, between 30 and 40 inches, inclusive, between 34 and 36 inches, inclusive, or about 36 inches. A longitudinal axis LA can extend through the pendulum rocker brush assembly 100, and in particular, the rocker arm 110. This longitudinal axis can be substantially vertical in some application, or angled relative to vertical in other applications.

A coupling projection 120 can extend from and be joined with the rocker arm 110 adjacent a second end of the rocker arm 110. An exemplary coupling projection 120 can be seen in more detail in FIG. 3. Optionally, the coupling projection 120 can extend perpendicularly from the rocker arm 110, but alternatively, the coupling projection 120 can extend from the rocker arm 110 at any suitable angle. In some cases, the coupling projection 120 and the rocker arm 110 can form one contiguous piece.

Figure 3:
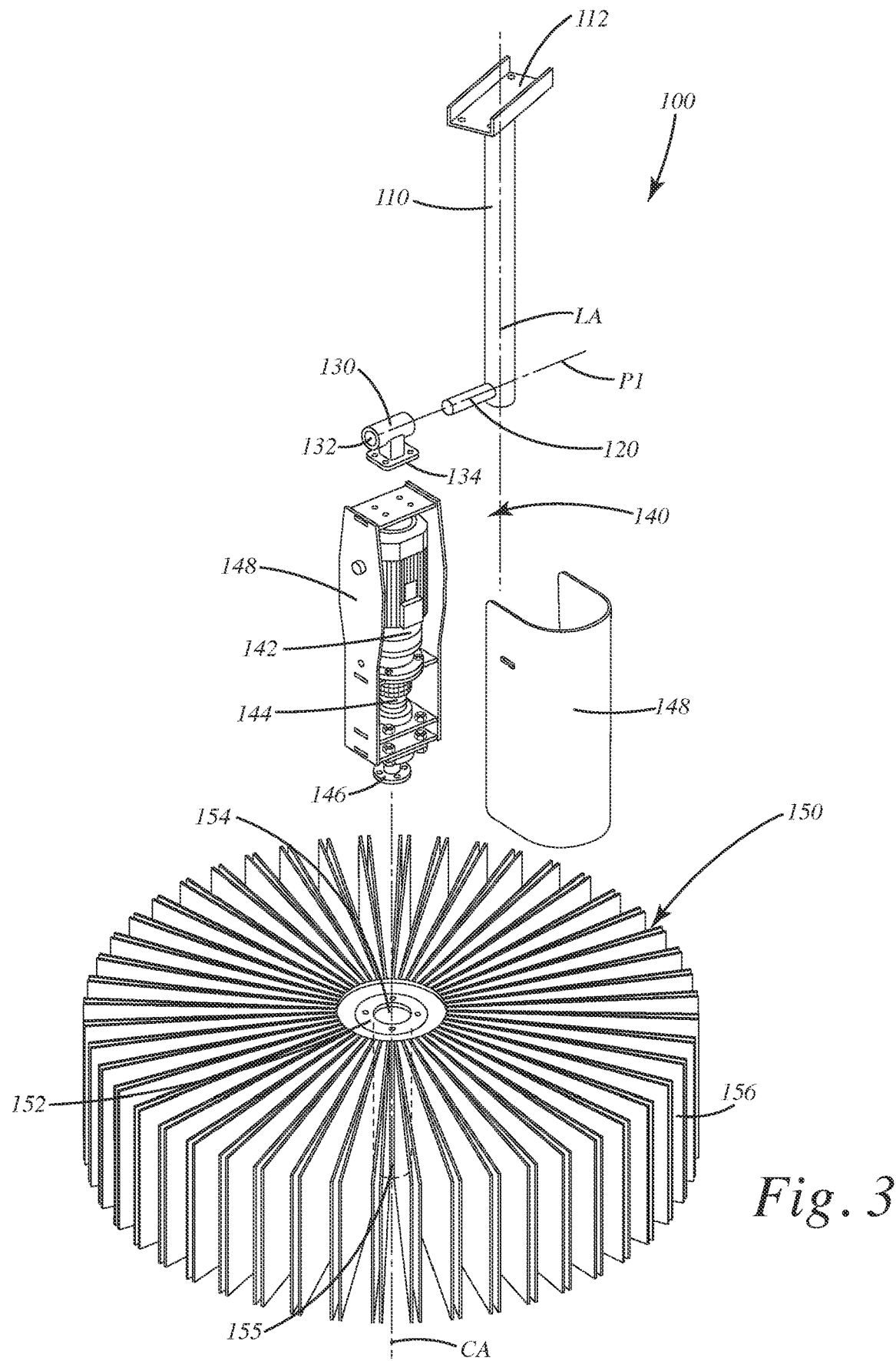
FIG. 3 is an exploded view perspective of a pendulum rocker brush assembly.

In FIG. 3, the pendulum rocker brush assembly 100 is shown in an exploded perspective view. A rotatable coupler 130 can define an aperture 132 and a coupling surface 134. The rotatable coupler 130 can include or be in the form of a pivot bushing, a sleeve, a tube, an array of rings or hooks or some other configuration, all referred to as a pivot bushing herein. As shown, the aperture 132 can be a generally circular or cylindrical configuration, however, other configurations can be selected depending on the application. The aperture 132 can be sized and shaped to rotatably receive the coupling projection 120 therein.

This projection 120 can include or be in the form of a rod, a pin, a bar or other elongated element, all referred to interchangeably as a pin or projection herein, which further can be of a cylindrical or other configuration depending on the application. The projection can project orthogonally from the rocker arm 110, and generally perpendicular to the longitudinal axis LA of the arm 110. The projection can be welded, fastened or integral with the rocker arm 110. The projection can be slightly longer than the coupler 130. Optionally, the projection can include a threaded bore (not shown) that received a threaded fastener therein, such that the head of the fastener captures the coupler on the projection so that the coupler does not rotate off the projection in use. Other ways to secure the coupler rotatably to the projection are contemplated as well. Optionally, it will be appreciated that the coupler and projection or pin can be reversed, such that the coupler is on the rocker arm 110, and the projection or pin is mounted to or extends from the motor assembly 140.

Figure 4:
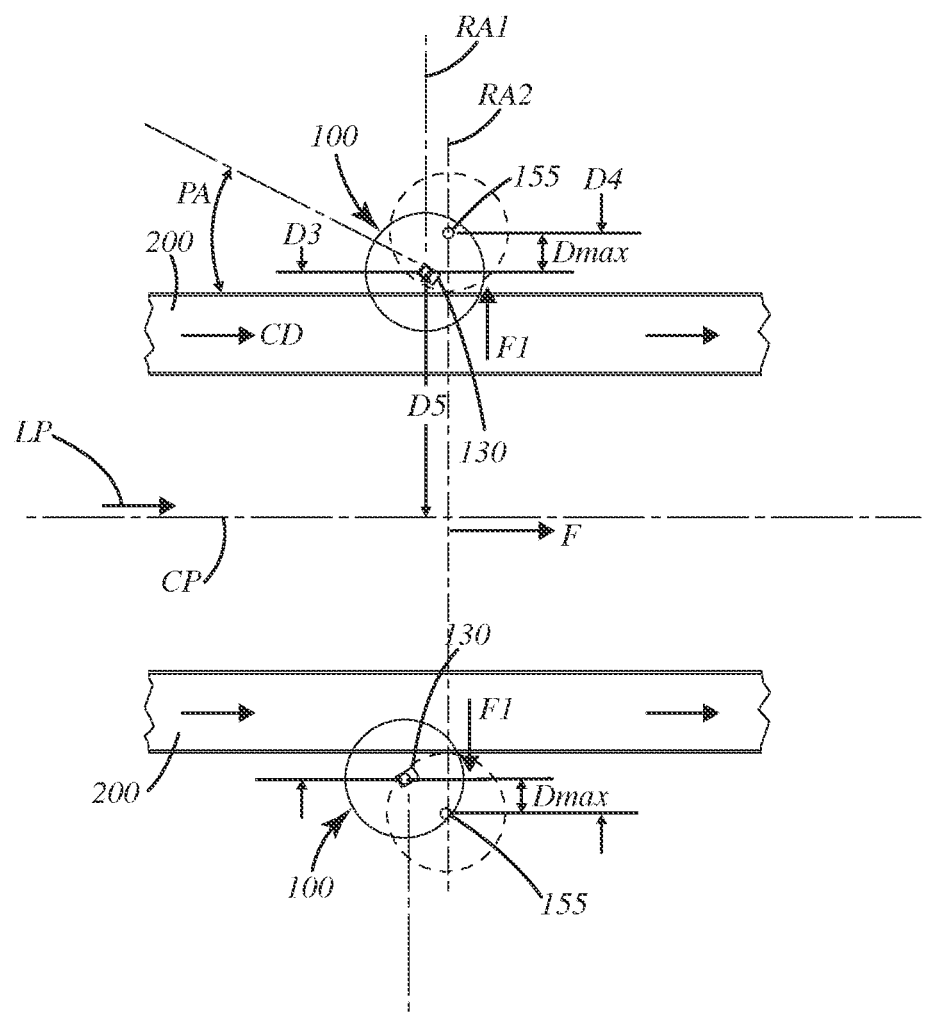
FIG. 4 is a top plan view of a pendulum rocker brush assembly as installed in a car wash.
Figure 6:
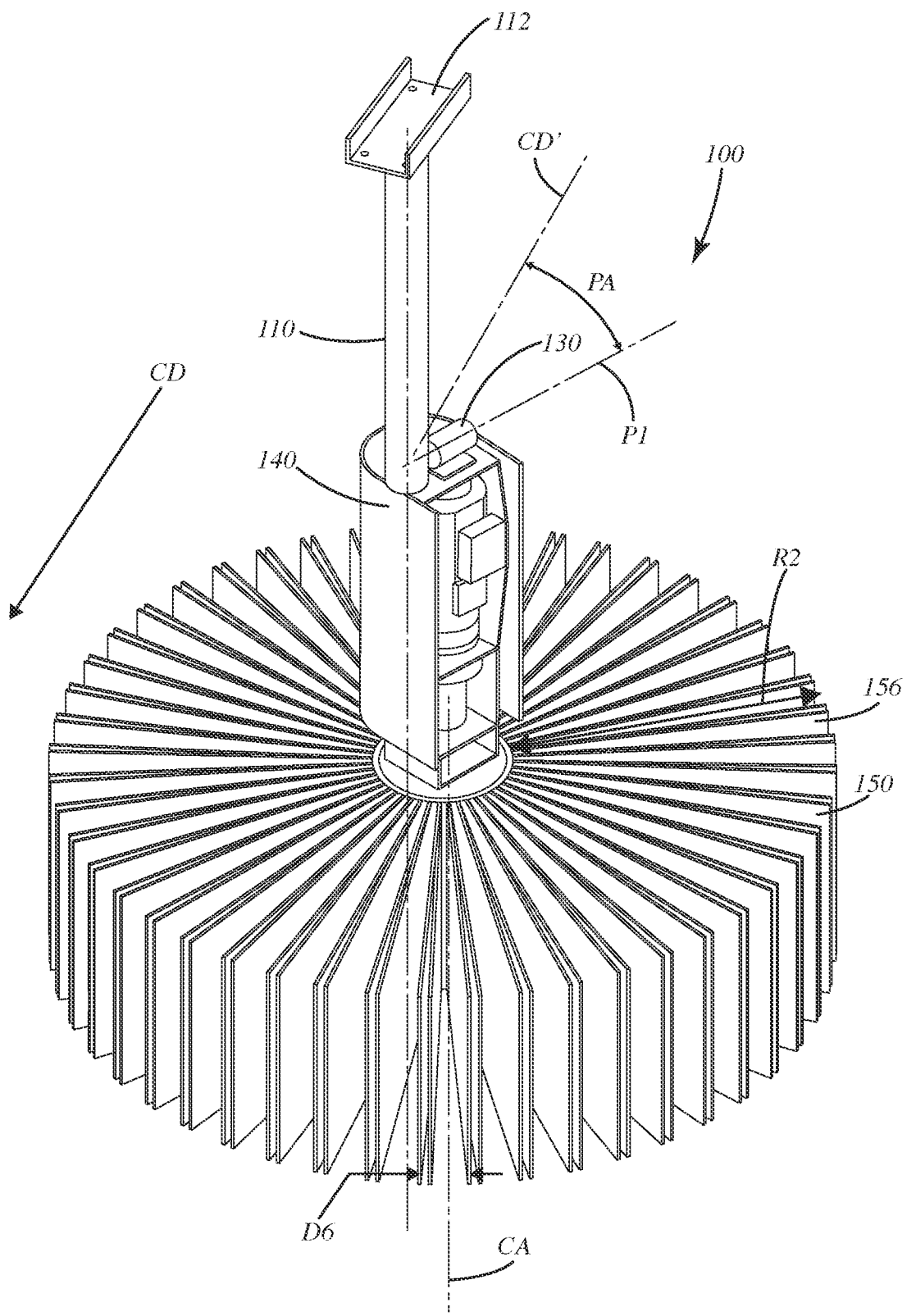
FIG. 6 is a perspective view of a pendulum rocker brush assembly.
Figure 7:
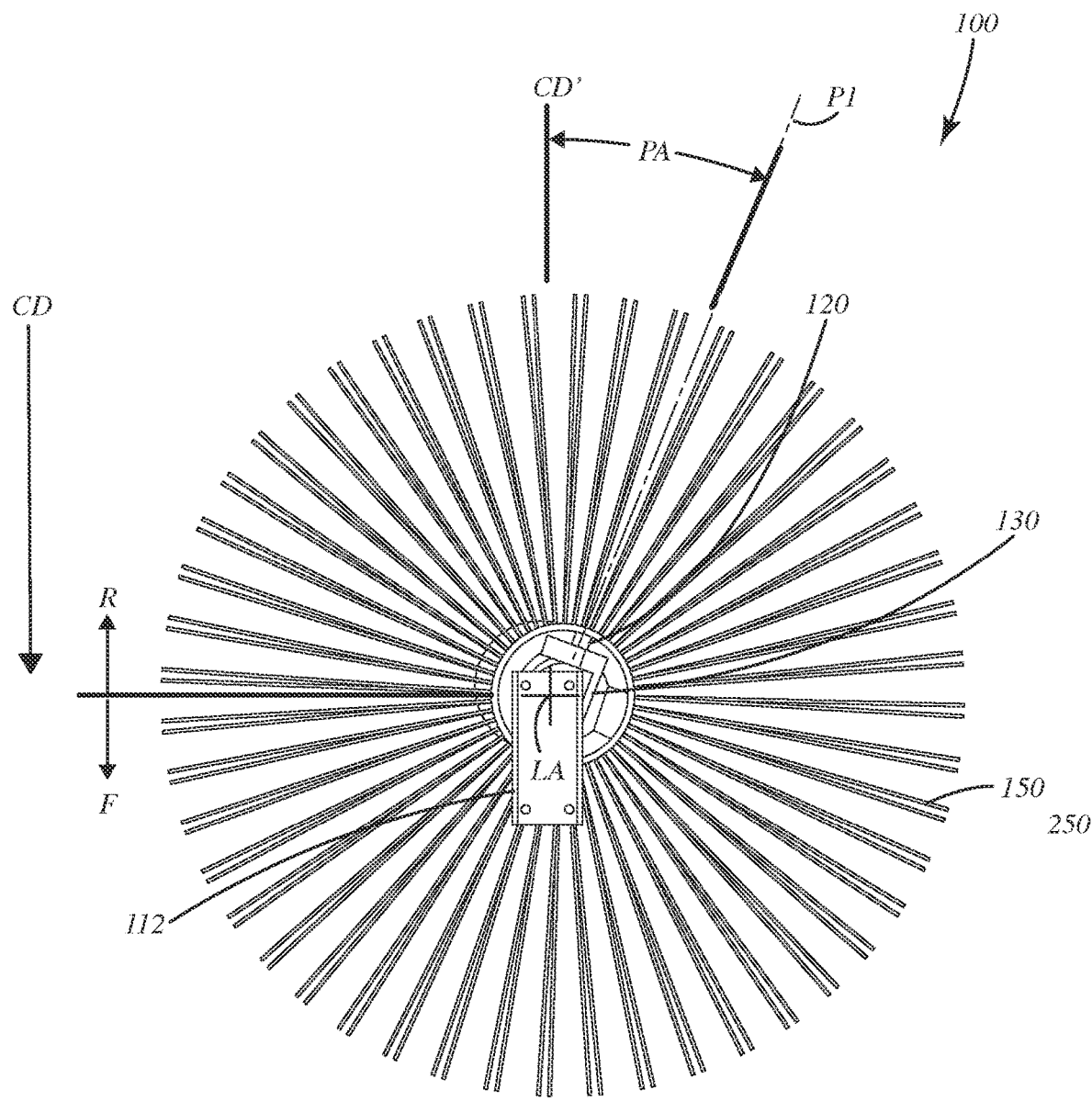
FIG. 7 is a top view of a pendulum rocker brush assembly.

The projection fits inside the aperture and is rotatable thereto to allow everything below the coupler 130 to freely rotate, swing or pivot in an arcuate manner about a pivot axis P1 defined by the coupler and/or projection. This pivot axis P1 can intersect and/or lay along the longitudinal axis LA. Optionally, the pivot axis P1 can be offset from the conveyor direction CD as shown in FIGS. 6 and 7. For example, there, the conveyor direction CD can be parallel to a conveyor direction reference line CD' that intersects the longitudinal axis LA. The pivot axis P1 can be offset by a pivoting angle PA from the conveyor direction reference line CD', and thus the conveyor direction CD, as well as the conveyor belt axis LP, as shown in FIG. 4. The pivot axis also can extend rearward in direction R from the longitudinal axis, away from a forward direction F as shown in FIG. 7. Further optionally, the pivoting angle PA can be optionally between 0 and 30 degrees, inclusive, between 20 and 40 degrees, inclusive, between 10 and 45 degrees, inclusive, between 15 and 45 degrees, inclusive, between 20 and 25 degrees inclusive, or about 22.5 degrees. With this angle, the rotating brush 150 and central support member 152 can swing and pivot outward from the passing vehicle easily and effectively, and tends not to bump, bounce or stutter back against the side of the vehicle surfaces uncontrollably through a wide range of RPMs. This angle also can provide adequate clearance of the brush head 150 to swing or tilt substantially away from the vehicle, while still providing adequate contact between the vehicle and bristles to enable thorough cleaning thereof.

Returning to FIG. 3, a motor assembly 140 can be joined with the rotatable coupler 130 through the coupling surface 134, which as shown can be in the form of a plate that can be bolted with fasteners to the motor assembly so that the motor assembly is suspended under the plate, hanging downward below the rocker arm and the coupler 130. The motor assembly 140, rocker head 150 and all the components thereof can be freely suspended from the coupler, without any part thereof supporting the structures from the ground surface. In this case, everything can hang freely under the force of gravity below the coupler, and can swing about the pivot axis P1 when engaged by a force F1 as described below.

Optionally, although not shown, the projection and the coupler with the aperture can be reversed, so the aperture is associated with the rocker arm and the projection is associated with the motor assembly 140. The motor assembly 140 can include a motor 142 and a motor shroud 148. The motor 142 can include a motor body 144 and a motor shaft 146. The motor shroud 148 can surround the motor body 144 with the motor shaft 146 extending outside of the motor shroud 148. As shown in FIG. 3, the motor shroud 148 can include two pieces that can be fastened together to surround the motor 142. Alternatively, the motor shroud 148 can be manufactured as one piece or in more than two pieces. An upper surface of the motor shroud 148, or an upper portion of the motor assembly 140 in general, can be joined with the coupling surface 134 of the rotatable coupler 130. Optionally, although not shown, one or more weights can be fastened, joined or otherwise secured to the motor assembly or the rocker brush head distal from the pathway to flare the brush head and bristles into the vehicle on the pathway more while having the pressure adjustable thru movement of the weights. Generally, weights can be added in any position relative to the head, the motor or other parts of the assembly to increase, reduce, or adjust the pressure applied to the vehicle. These weights can be moved up and down the assembly, or around the associated axes, to tune the pressure or movement of the brush head relative to the vehicle.

Returning to FIG. 1, a rocker brush head 150 can be joined with the motor shaft 146. The rocker brush head 150 can include a central support member 152 and a plurality of flexible bristles 156. The central support member 152 can define a support aperture 154, as shown in FIG. 3. In some cases, the member 152 can be in the form of a tube or cylinder that is suspended below the motor shaft. Optionally, the rocker brush head 150 can be joined with the motor shaft 146 through the support aperture 154 of the central support member 152. The motor shaft optionally can be aligned with the central support axis CA of the central support member 152 and can extend in a vertical orientation along that central support axis CA. Further optionally, that axis CA can be laterally offset a distance D6 from the longitudinal axis LA. This distance D6 can be optionally less than 10 inches, less than 8 inches, less than 6 inches, less than 4 inches, or between 1 inch and 8 inches, inclusive.

The central support member 152 can serve as a mounting structure for the flexible bristles 156. The bristles 156 can be constructed from a variety of materials, and can be semi-rigid, flexible, compliant, limp and/or bendable, depending on the application. The bristles 156 can be made of any suitable material. For example, the bristles 156 can be constructed from cloth, fabric, foam, polymers, silicone, microfiber and/or combinations of the foregoing. The bristles 156 can be manufactured in any manner to make them suitable for cleaning vehicles. In some cases, each of the bristles 156 can be constructed from an elongated and/or rectangular sheet or panel of cloth or fabric that is or is not folded over on itself. In other cases, each of the bristles 156 can be twisted around itself or twisted with another bristle. Also, it is to be appreciated that although referred to as bristles, these elements can be in the form of sheets, panels, pieces of different shapes, elongated elements and the like, and may or may not be rigid.

Figure 2:
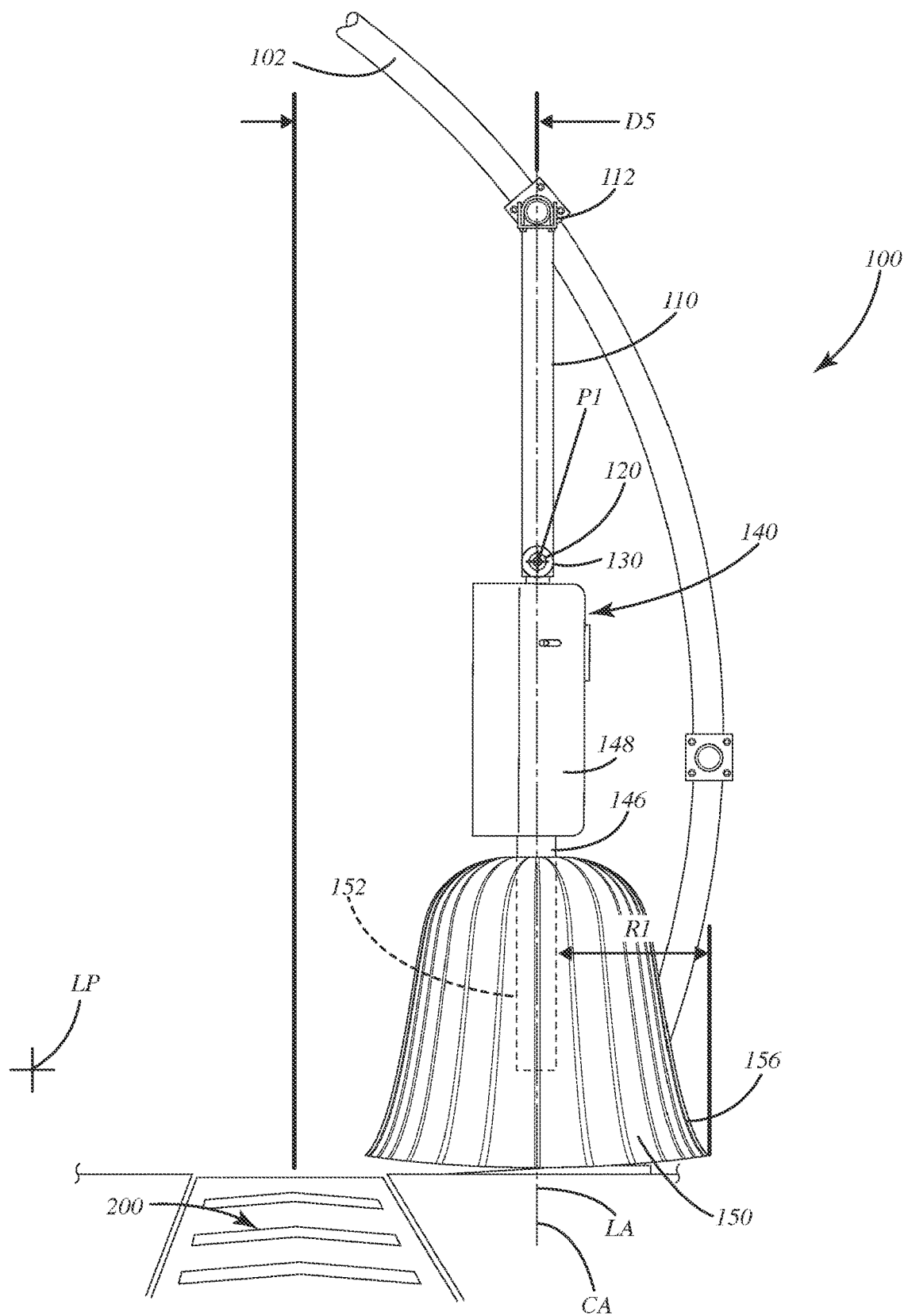
FIG. 2 is a front view of the pendulum rocker brush assembly as installed in a car wash, but not in motion.

The bristles can be attached at one end to the central support member 152. Optionally, the bristles 156 can be spaced evenly across an outer surface of the central support member 152. The flexible bristles 156 each can have a first position with respect to the longitudinal axis LA and a second position with respect to the longitudinal axis LA. The first position of the bristles 156 can be substantially vertical or substantially parallel to the longitudinal axis LA and/or central axis CA of the central support as shown in FIG. 2. In this position, the bristles can be limp, and can hang downward alongside the central axis. When the motor assembly spins the head, however, the bristles can move outward to a second position, optionally under centrifugal force so that they can be substantially horizontal or substantially perpendicular to the longitudinal axis LA or central axis CA as shown in FIGS. 1 and 6. As shown in FIG. 2, the length R1 of the bristles 156 extending away from the central axis CA can be optionally about 12 inches, about 14 inches or about 16 inches, when the rocker head is not spinning. As shown in FIG. 6, when the rocker head spins, the length R2 of the bristles 156 extending away from the central axis CA can increase, and can become greater, optionally about 20 inches, about 24 inches, about 26 inches, or about 28 inches. The bristles 156 can have lengths R1 and R2, which can vary depending on the spinning, washing, cleaning or treatment function of the rocker brush on a vehicle surface.

The rocker brush head 150 and the motor assembly 140 can have a combined second length L2. This second length L2 can be a length between the rotatable coupler 130 and a distal or lowermost end 155 of the central support member 152. The second length L2 optionally can be between 40 and 60 inches, inclusive, between 45 and 55 inches, inclusive, between 50 and 55 inches, inclusive, or about 52 inches. The overall length of the assembly 100 from the bottom of the first coupler 112 to the bottom of the rocker brush head 150 at the distal end 155 can be optionally between 75 inches and 95 inches, inclusive, between 80 inches and 90 inches, inclusive, or between 84 inches and 88 inches, inclusive, or other lengths depending on the application.

Further optionally, the first length L1 and the second length L2 can be established in a ratio of one to the other to allow the rocker head to be positioned adjacent a vehicle on the pathway LP to swing adequately, but not too rapidly, away from the vehicle surface to avoid damaging the surface, and/or to satisfactorily follow the contours of most conventional vehicles. For example, the ratio of the first length to the second length can be optionally greater than 1:1.2, greater than 1:1.4, greater than 1:1.5, between 1:1 and 1:2, or other ratios.

As mentioned above, when the motor 142 is powered, optionally by an electrical power source, the motor shaft 146 can spin and rotatably actuate the rocker brush head 150. As the rocker brush head 150 spins, the flexible bristles 156 can move from the first position to the second position. The speed at which the rocker brush head 150 spins can be configured to sufficiently clean the rocker panels of the vehicle without causing damage to the vehicle. Optionally, the speed of the rocker head can be optionally between 50 and 100 rotations per minute ("RPM"), inclusive, between 70 and 90 RPM, inclusive, between 80 and 90 RPM, inclusive, or at least 83 RPM.

Figure 5:
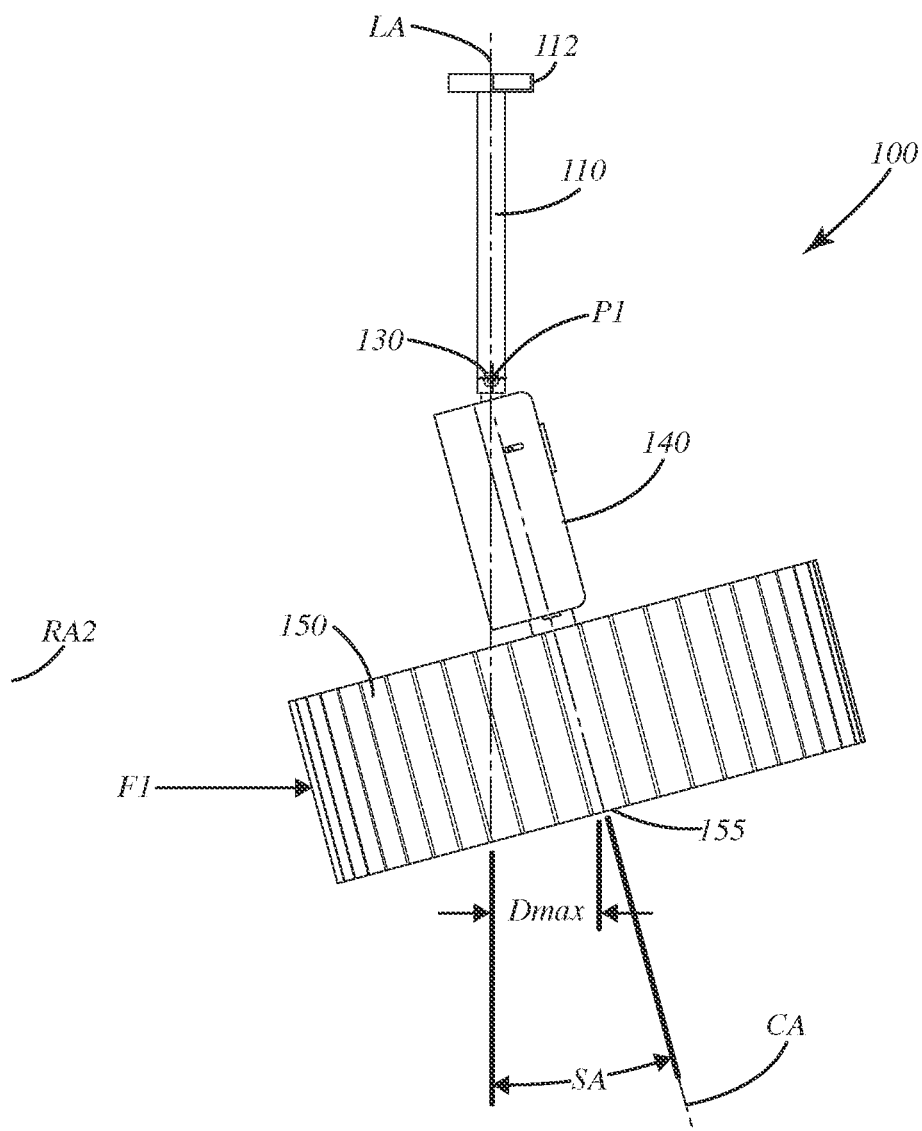
FIG. 5 is an elevation view of a pendulum rocker brush assembly.

The rocker brush head 150 and the motor assembly 140 can be configured to pivot about the rotatable coupler 130 as one unit. As shown in FIG. 5, the rocker brush head 150, the motor assembly 140 and the central support 152 can pivot about the rotatable coupler 130, and in particular the pivot axis P1, when the rocker brush head 150 encounters an opposing force above a movement threshold. The amount of pivoting can be referred to as the swing of the rocker brush, and can result in the central axis CA of the central support 152 swinging through a swing angle SA relative to the longitudinal axis LA, which can be vertical.

Optionally, a movement threshold can be set to allow the rocker brush head 150 and the motor assembly 140 to swing outward to match the profile and/or contours of the vehicle. Optionally, the movement threshold can be set to the amount of force the rocker brush head 150 would encounter if a vehicle was closer to the rocker brush head 150 than the car wash was designed for and therefore the vehicle was at an increased risk of being damaged by the rocker brush head. Further optionally, the movement threshold can be a force F1 exerted by and against the vehicle, which can be optionally at least 0.5 pounds, at least 1 pound, at least 2.5 pounds, at least 5 pounds, at least 10 pounds, at least 20 pounds or at least 25 pounds.

As mentioned above, the rocker brush head 150 and the motor assembly 140 can pivot about the rotatable coupler 130 to a maximum angle or swing angle SA and a maximum distance D1 with respect to the longitudinal axis LA. The swing angle can be optionally at least 5 degrees, at least 10 degrees, at least 15 degrees, between 10 and 45 degrees, inclusive, between 10 and 20 degrees, inclusive, between 10 and 15 degrees, inclusive, or about 15 degrees, depending on the application. The maximum distance Dmax from the longitudinal axis LA to the distal end 155 of the rocker brush head 150 can be optionally at least 10 inches, at least 20 inches, at least 30 inches, between 10 and 20 inches, inclusive or about 12.5 inches. The center of mass Cm can move a distance D1 from the longitudinal axis LA when the rocker brush head 150 and the motor assembly 140 swing outward. Optionally, the maximum distance the center of mass Cm can move from the longitudinal axis LA is optionally at least 4 inches, at least 6 inches, at least 8 inches, between 4 and 8 inches, inclusive, between 6 and 7 inches, inclusive, or about 6.5 inches. This distance can be selected so that the rocker head and motor assembly do not sway excessively after a vehicle passes the assembly.

The pivoting motion of the pendulum rocker brush assembly 100 of the current embodiment and all others herein can allow for reduced maintenance of the assembly 100 because there can be optionally no bearings to grease and no shocks, springs or rubber bumpers to replace. The entire assembly of the current embodiment and all others herein can be void of bearings, springs shocks and bumpers to control, modulate or move the rocker head 150 and motor assembly 140 relative to the rocker arm 110, or to otherwise return the central axis CA of the support 152 to a vertical orientation, or parallel to the longitudinal axis LA. The angle of the pendulum rocker brush assembly 100 can be the same for all types of vehicles because the assembly 100 can pivot to match the profile of the vehicle. Once the position of the pendulum rocker brush assembly 100 is set, the assembly 100, and in particular, the rotatable coupler, needs no maintenance.

In FIG. 4, a plan view of two pendulum rocker brush assemblies 100 installed in a car wash is shown. The pendulum rocker brush assemblies 100 are shown in their resting position and at their maximum distance when pivoted about rotatable coupler 130. The rocker brush head 150 and the motor assembly 140 can pivot about the rotatable coupler 130 when the rocker brush head 150 encounters an opposing force F1 above a movement threshold. The car wash can include two conveyor belts 200. The conveyor belts 200 can move a vehicle through the car wash. In the case of the pendulum rocker brush assemblies 100, the conveyor belts 200 can move the vehicle alongside the pendulum rocker brush assemblies 100 to clean the rocker panels of the vehicle. D2 can be the distance from the longitudinal axis LA to the edge of the conveyor belt 200. D2 can be optionally between 10 and 30 inches, inclusive, between 10 and 20 inches, inclusive, or about 17 inches. D3 can be the distance between the longitudinal axis LA of the two pendulum rocker brush assemblies 100 when the assemblies are in their resting position. Put another way, D3 can be the minimum distance between the longitudinal axis LA of the two pendulum rocker brush assemblies 100. D3 can be optionally between 100 and 150 inches, inclusive, between 110 and 140 inches, inclusive, or about 129 inches. D4 can be the maximum distance between the LCP of the two pendulum rocker brush assemblies 100. Put another way, D4 can be the distance between the distal ends 155 of the central supports of the two pendulum rocker brush assemblies 100 when the pendulum rocker brush assemblies 100 are moved their maximum distance Dmax. D4 can be optionally between 125 and 200 inches, inclusive, between 140 and 160 inches, inclusive, or about 154 inches. Optionally, the ratio between D3 and D4 can be about 1:1.2. The car wash can have a center CP of the pathway LP. D5 can be the distance between the longitudinal axis LA and the center CP of the pathway LP. D5 can be optionally between 30 and 50 inches, inclusive, between 30 and 40 inches, inclusive, or about 32 inches. Dmax can be the maximum distance of the distal ends 155 from the longitudinal axis LA when the pendulum rocker brush assembly 100 swings outward as noted above.

As shown in FIG. 4, the vertical longitudinal axes of the rocker assemblies on opposite sides of the vehicle path LP can be disposed on a rocker axis RA1 that is perpendicular to the center CP of the pathway LP. The rocker arms can remain on this rocker axis RA1 even as the central supports 155 and rocker heads 150 of the rocker assemblies on opposite sides swing outward from the conveyor belts on opposite sides of the pathway LP. The lower distal ends 155 can be moved out and lay along a second rocker axis RA2 after the rocker heads swing their respective swing angles SA, which may or may not be equal, depending on the contact with the vehicle on opposite sides. The second rocker axis can be forward F of the first rocker axis upon such swinging. While the lower distal ends 155 lay along this second rocker axis RA2, the portion of the motors 140 above the ends 155 can be disposed at the respective swing angles SA, and the bristles 156 can likewise rotate about the central support members as they rotate at the swing angles SA. The rocker assemblies 100 also optionally can be disposed at least partially outward from the respective conveyors or paths on opposite sides of the center CP, and can remain in this lateral position relative to the pathway throughout their operation.

In one aspect, a pendulum rocker brush assembly can have a rocker arm attached to a car wash structure at one end. The rocker arm can have a first length. A coupling projection can extend perpendicularly from the rocker arm adjacent a second end of the rocker arm. A rotatable coupler can define an aperture and a coupling surface. The coupling projection can be movably joined with the aperture of the rotatable coupler. A motor assembly can include a motor and a motor shroud. The coupling surface of the rotatable coupler can be joined with a top surface of the motor shroud. The motor can include a motor body and a motor shaft. The motor shroud can surround the motor body with the motor shaft extending outside of the motor shroud. A rocker brush head can be joined with the motor shaft. The motor can actuate the rocker brush head when the motor is turned on. The rocker brush head and the motor can pivot as one unit about the rotatable coupler when the rocker brush head encounters an opposing force above a movement threshold.

In another aspect, a pendulum rocker brush assembly can include a rocker arm, a motor assembly, and a rocker brush head. The rocker arm can be fixedly attached to a car wash structure at a first end. The motor assembly can include a motor and a motor shroud. The motor can include a motor body and a motor shaft. The motor shroud can be rotatably joined with the rocker arm adjacent a second end of the rocker arm. The motor shroud can surround the motor body with the motor shaft extending outside of the motor shroud. The rocker brush head can be joined with the motor shaft. The rocker brush head can be actuated when the motor is turned on. The motor assembly and the rocker brush head can pivot outward as one unit when the rocker brush head encounters an opposing force above a movement threshold.

A first alternative embodiment of the pendulum rocker brush assembly is shown in FIGS. 8-12 and generally designated 201. This embodiment can be similar or identical to the embodiment disclosed above in structure, function and operation with several exceptions. For example, the assembly 201 can include a rocker arm 210, a coupler 230, a motor assembly 240 and a rocker brush head 250. The rocker arm 210 can be fixedly attached to a car wash structure or support structure 102 via a first or fixed coupler 212, which optionally can include one or more U-bolts 212U joined with a plate 212P. The rocker arm 210 can be secured to the support structure 102, which can be in the form of an arch or frame extending over an underlying vehicle pathway 200. The pendulum rocker brush assembly 201 can be secured to the car wash structure 102 so it is aligned with and properly spaced relative to the pathway 200. The plate and U-bolts or some other structure can be fixedly and immovably (but adjustably) joined with the car wash structure 102 to secure the rocker arm thereto.

The rocker arm 210 of this embodiment can be structured and oriented to provide additional clearance to a vehicle moving on the pathway 200. As shown in FIGS. 1 and 2, the rocker arm 210 can include an upper or first end 211 and a second or lower end 213. The rocker arm can have a first length L4, which can be optionally between 5 and 60 inches, inclusive, between 5 and 40 inches, inclusive, between 40 and 55 inches, inclusive, between 45 and 55 inches, inclusive, between 40 and 50 inches, inclusive, or about 48 inches.

Figure 10:
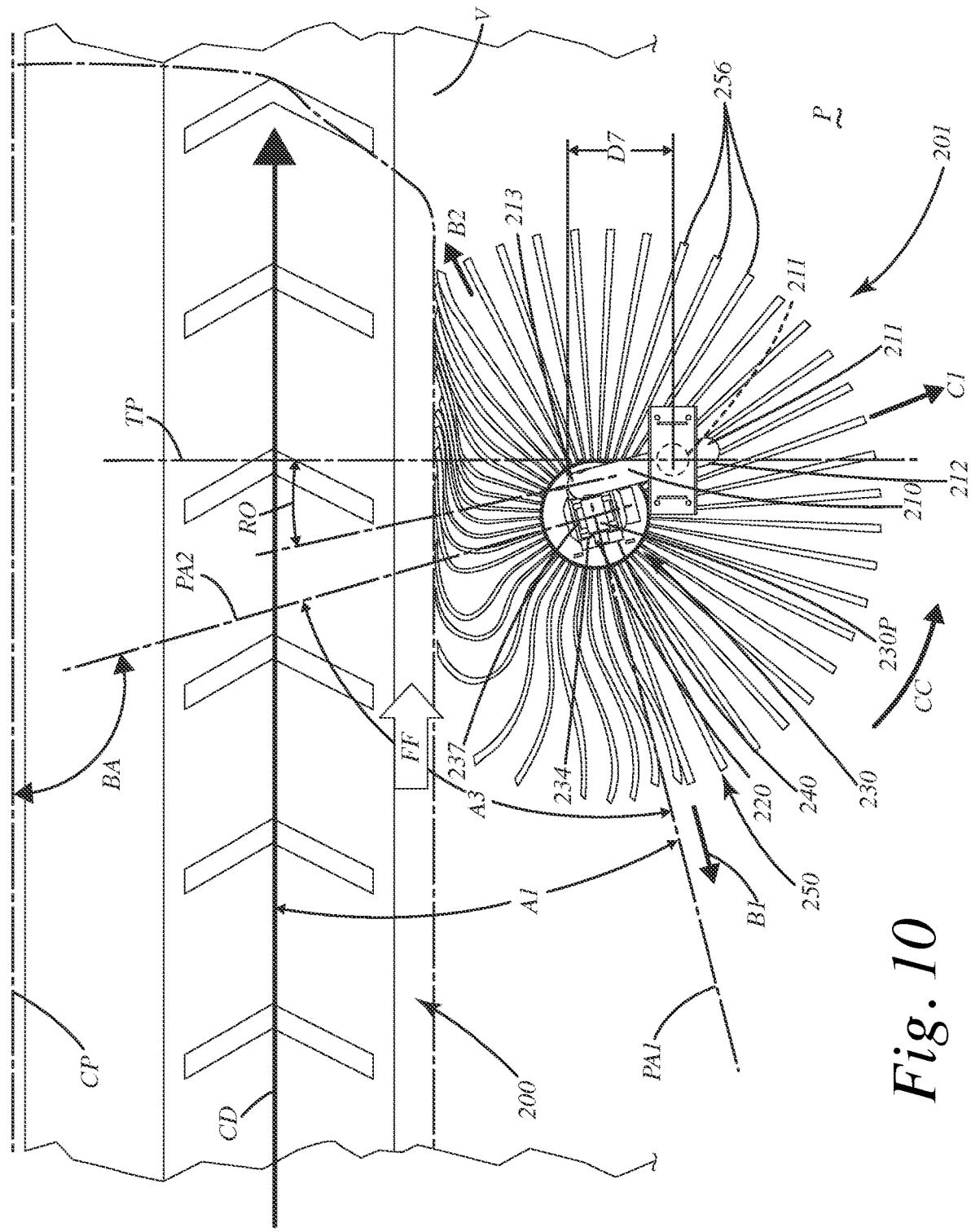
FIG. 10 is a top plan view of the alternative embodiment of the pendulum rocker brush assembly.
Figure 11:
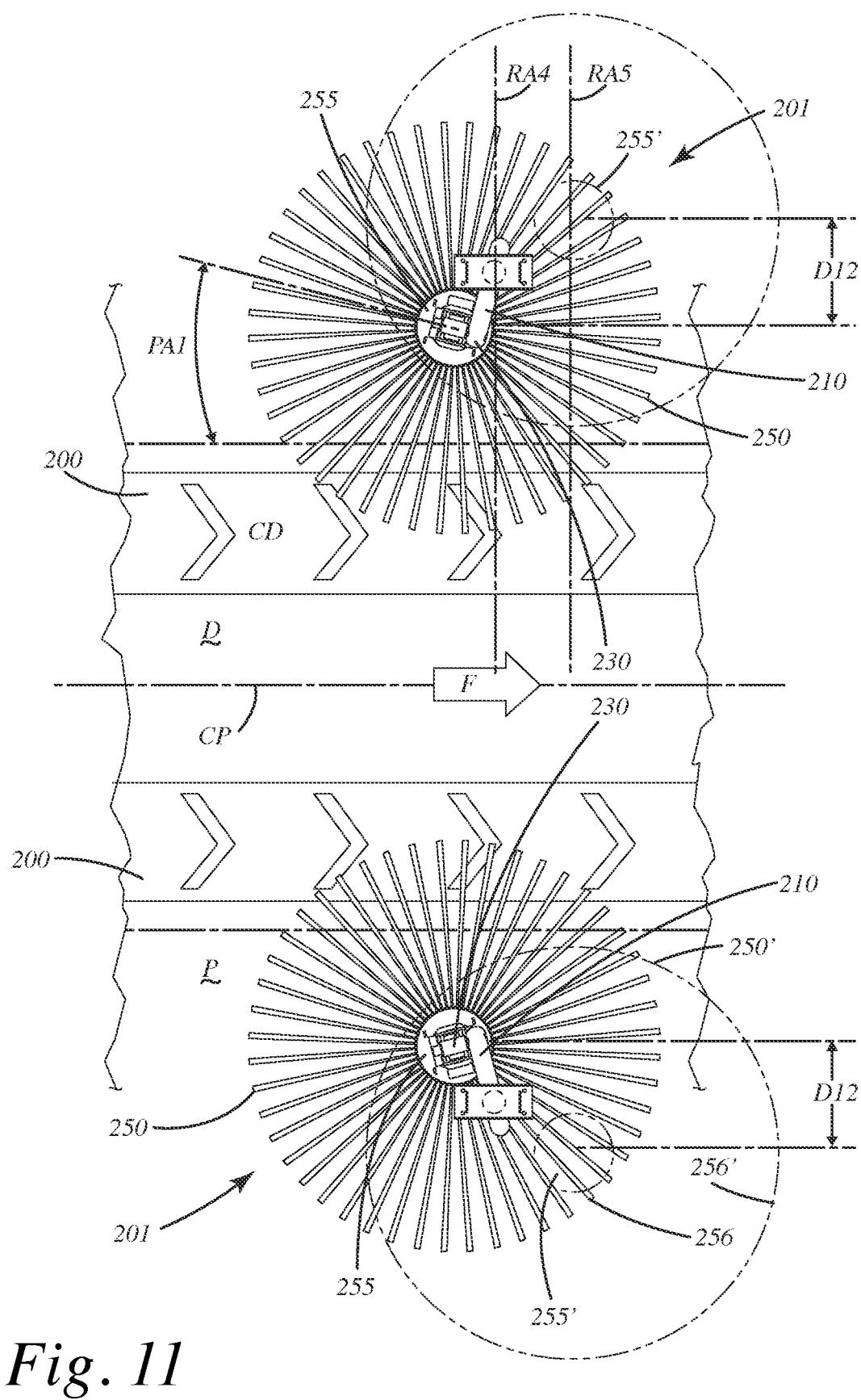
FIG. 11 is another top plan view of the alternative embodiment of the pendulum rocker brush assembly, with opposing assemblies along sides of a vehicle path in a car wash.

The rocker arm 210 also can include an offset distance D7 between the upper end 211 and the lower end 213. The offset distance D7 can be taken transverse and/or perpendicular to the conveyor direction CD along a horizontal plane. The offset distance D7 also can be taken from a vertical reference line VL that extends through the lower end 213 of the rocker arm 210, to the upper end 211 of the rocker arm. The conveyor direction CD can be parallel to the conveyor belt longitudinal axis and/or a center CP of the vehicle pathway 200 as shown in FIGS. 10 and 11. The offset distance D7 can be the distance between the upper end 211 and the lower end 213 of the rocker arm 210. This distance optionally can be at least 1 inch, at least 2 inches, at least 3 inches, at least 4 inches, at least 5 inches, at least 10 inches, between 3 inches and 24 inches, inclusive, between 4 inches and 12 inches, inclusive or other distances, depending on the application, the location of the conveyor belt and the size of vehicles traveling along the conveyor belt.

The offset distance D7 can accommodate larger vehicles and/or mirrors M that extend laterally from vehicles V. For example, as shown further in FIG. 12, the offset distance D7 can provide clearance for mirrors M of a vehicle V travelling along the vehicle pathway 200 and being conveyed by the respective conveyors. The offset distance D7 also can allow the lower end 213 of the rocker arm 210 to be placed closer to the vehicle V and generally closer to the conveyor centerline or axis CP than the upper end 211. As a result, the brush head 250, which is coupled to the lower end 213 is likewise positioned closer to the rocker panels of the vehicle V. This can allow for additional cleaning action given the further engagement with the vehicle in closer proximity of the brush to the areas to be cleaned.

Figure 9:
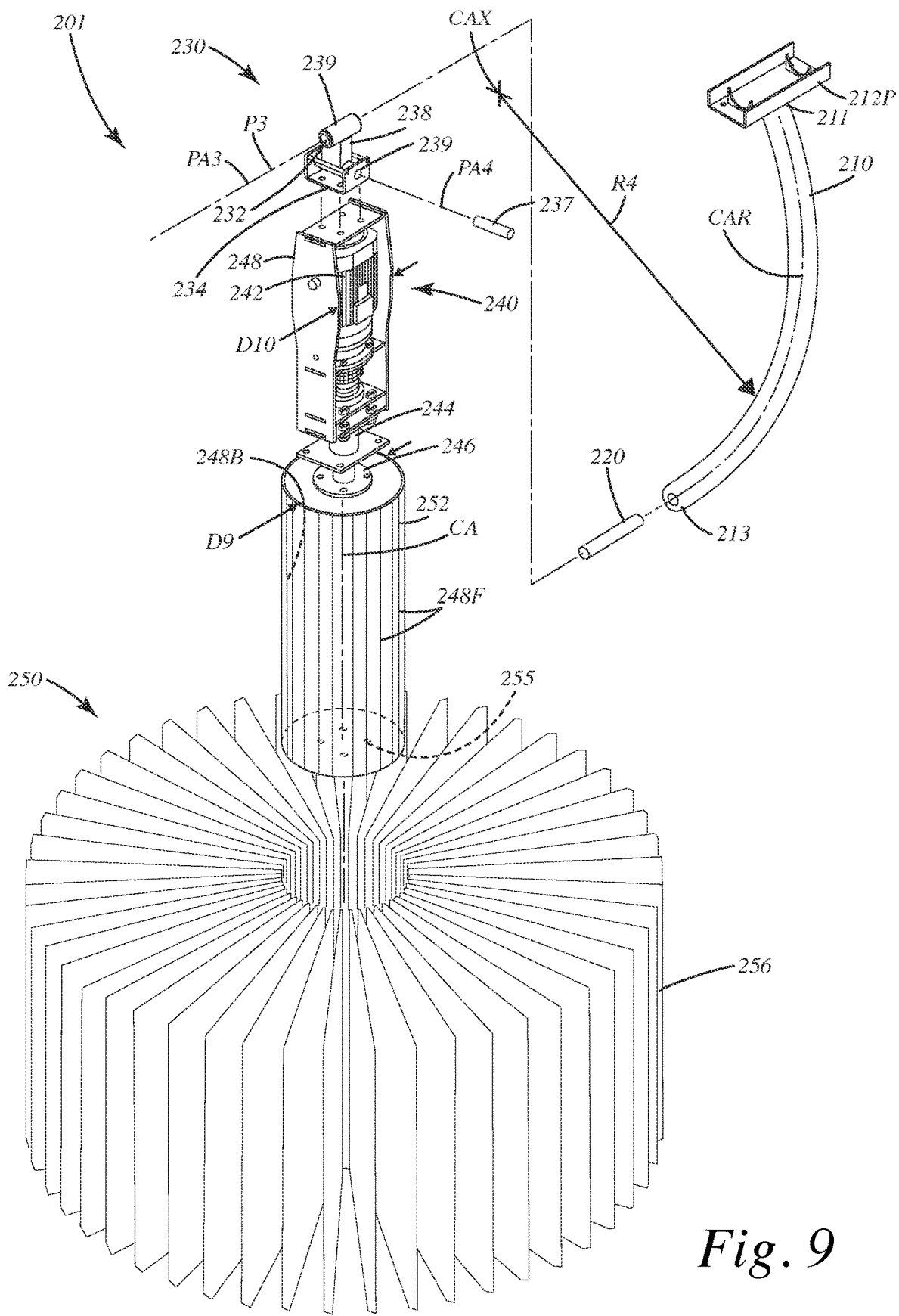
FIG. 9 is an exploded view of the alternative embodiment of the pendulum rocker brush assembly.

To achieve the offset distance D7, as shown, the rocker arm 210 can be curved, and can include a single or compound radius between the upper end 211 and the lower end 213. Optionally, the rocker arm can take other configurations to provide the offset distance. For example, the rocker arm can be bent and/or angled from the upper end 211 to the lower end 213. Other aesthetic configurations can be selected to provide the offset distance D7. As shown in FIG. 9, the rocker arm 210 can extend along a curvilinear axis CAR from the first or upper end 211 to the lower end 213. This curvilinear axis CAR can be disposed along a portion of a circle having a center CAX and a radius R4. The radius R4 can be optionally 1 foot to 8 feet, inclusive, 2 feet to 6 feet, inclusive or about 4 feet depending on the application.

The rocker arm 210 also can be offset at a rocker arm angle RO from the transverse plane TP which is transverse to and/or perpendicular to the conveyor direction CD or generally to the longitudinal axis or centerline CP. This rocker arm angle RO can be optionally 0 degrees to 45 degrees, inclusive, 5 degrees to 30 degrees, inclusive, 10 degrees to 20 degrees, inclusive, 10 degrees to 15 degrees, inclusive, or other angles depending on the application. This rocker arm angle RO can be set to counter the forward force FF of the vehicle as the vehicle travels along the vehicle pathway 200. This forward force FF can be produced due to the brush head 250 and the respective bristles 256 thereof engaging against the side or rockers of the vehicle. With this rocker arm 210 disposed at this rocker arm angle RO, the rocker arm can be less prone to bending at the lower end 213 in the direction CD of the conveyor which corresponds to the direction of the vehicle being conveyed on the conveyor. As a result, the rocker arm can have additional stability and strength to withstand the vehicle forward force FF so that it does not bend or break over time.

Optionally, the rocker arm angle RO also can offset the lower end 213 farther away from the conveyor axis LP or generally from the conveyors that move the vehicle V along the vehicle pathway 200. By placing the rocker arm 210 at the rocker arm angle RO relative to the transverse plane TP, rather than placing the rocker arm parallel to the transverse plane TP, the lower end 213 of the rocker arm and thus the rocker brush head 250 and other components can be moved or positioned about 1 inch, about 2 inches, about 3 inches, between 1 and 5 inches, inclusive, or between 1 and 3 inches, inclusive farther away from the conveyor axis or centerline CP. This, in turn, can move the lower end 213, the coupler 230 and the motor 240 farther away from the vehicle, while still providing sufficient cleaning engagement of the brush head 250 with the vehicle V.

The pendulum rocker assembly 201 as mentioned above can include a rotatable coupler 230. With reference to FIG. 9, this rotatable coupler 230 can be joined with the lower, second end 213 of the rocker arm 210. The rotatable coupler can include a coupling projection 220 which itself can extend from and be joined with the rocker arm 210 adjacent the lower, second end of the rocker arm 210. This projection, which can be in the form of a rod, a pin, a bar or other elongated element, all referred to interchangeably as a pin or projection herein, can be identical or similar to the projection of the embodiment above, and accordingly will not be described again here.

With further reference to FIG. 9, the rotatable coupler 230 can include or be in the form of a pivot bushing, a sleeve, a tube, an array of rings or hooks or some other configuration, all referred to as a pivot bushing 230P herein. That pivot bushing can be identical to the pivot bushing of the embodiment above, and therefore will not be described again in detail here. Suffice it to say that the bushing can define an aperture 232 sized and shaped to rotatably receive the coupling projection 220 therein. Other ways to secure the coupler rotatably to the projection are contemplated as well. Further optionally, the coupler and projection or pin can be reversed, such that the bushing is on the rocker arm 210, and the projection or pin is mounted to or extends from the motor assembly 240.

Like the embodiment above, the rotatable coupler 230 can allow everything below the coupler 230 to freely rotate, swing or pivot in an arcuate manner about or around a first pivot axis PA1 defined by the bushing and/or projection. This first pivot axis PA1 can be offset a first pivot angle A1 from the conveyor direction CD and center or centerline CP of the conveyor or vehicle pathway 200 as shown in FIG. 10. The pivot angle A1 can be optionally between 0 and 30 degrees, inclusive, between 20 and 40 degrees, inclusive, between 10 and 45 degrees, inclusive, between 15 and 45 degrees, inclusive, or about 15 degrees. With this angle, the rotating brush 250 and a brush core 252 can swing and pivot outward from the passing vehicle easily and effectively, such that the brush and bristles will not tend to bump, bounce or stutter back against the side of the vehicle surfaces uncontrollably through a wide range of RPMs of the brush. This angle also can provide adequate clearance of the brush head 250 to swing or tilt substantially away from the vehicle, while still providing adequate contact between the vehicle and bristles 256 thereof to enable thorough cleaning thereof.

Figure 12:
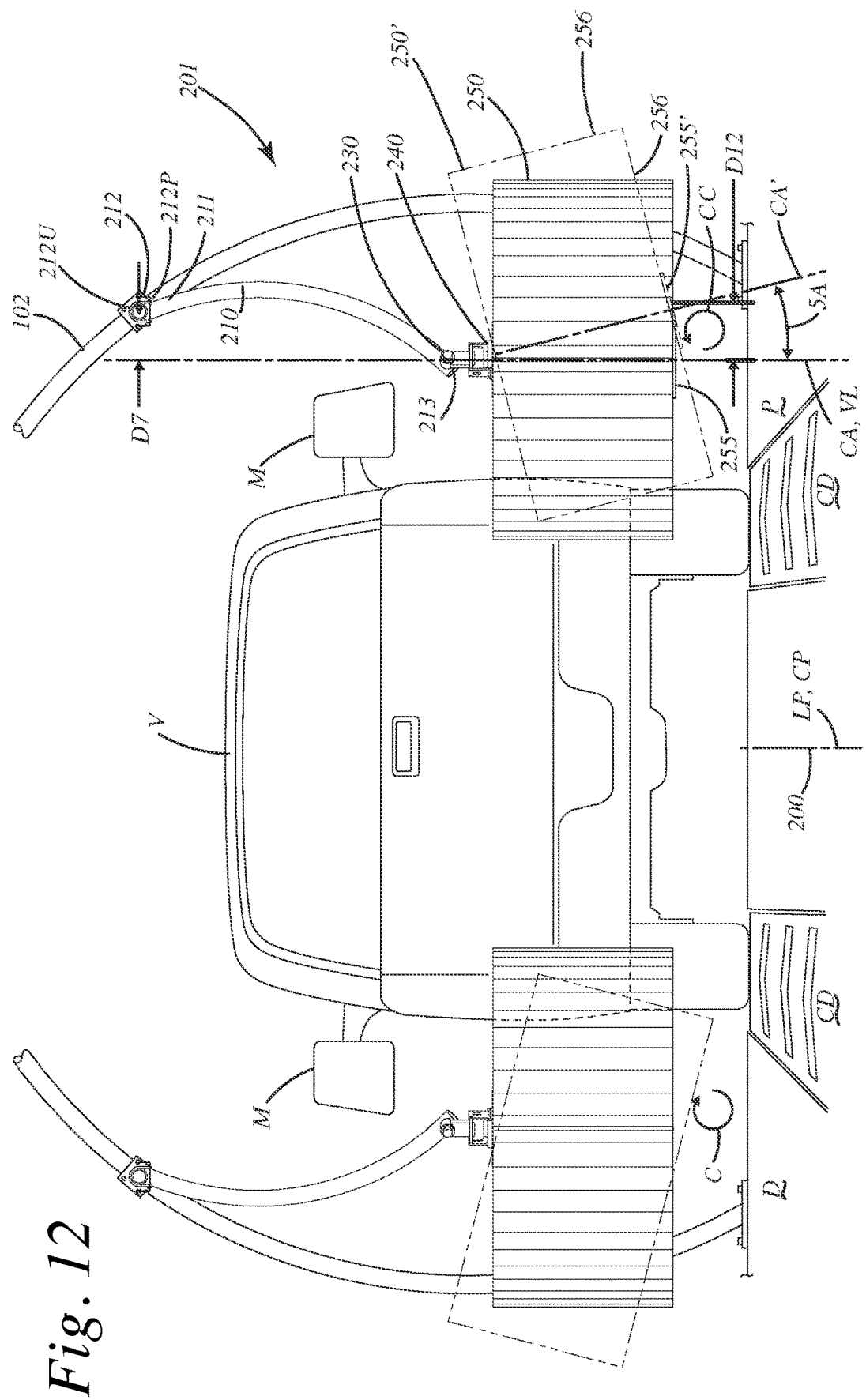
FIG. 12 is an upstream view of opposing pendulum rocker brush assemblies along the vehicle path in the car wash.

Optionally, opposing brush assemblies can be disposed on opposite sides of the vehicle pathway 200 to clean opposite sides of the vehicle V as shown in FIG. 12. These different brush assemblies can engage and clean the respective passenger and driver sides of the vehicle V, and are therefore identified as the passenger side P assembly and the driver side D assembly, located on the respective sides of the conveyor axis or centerline CP of the path 200.

Figure 8:
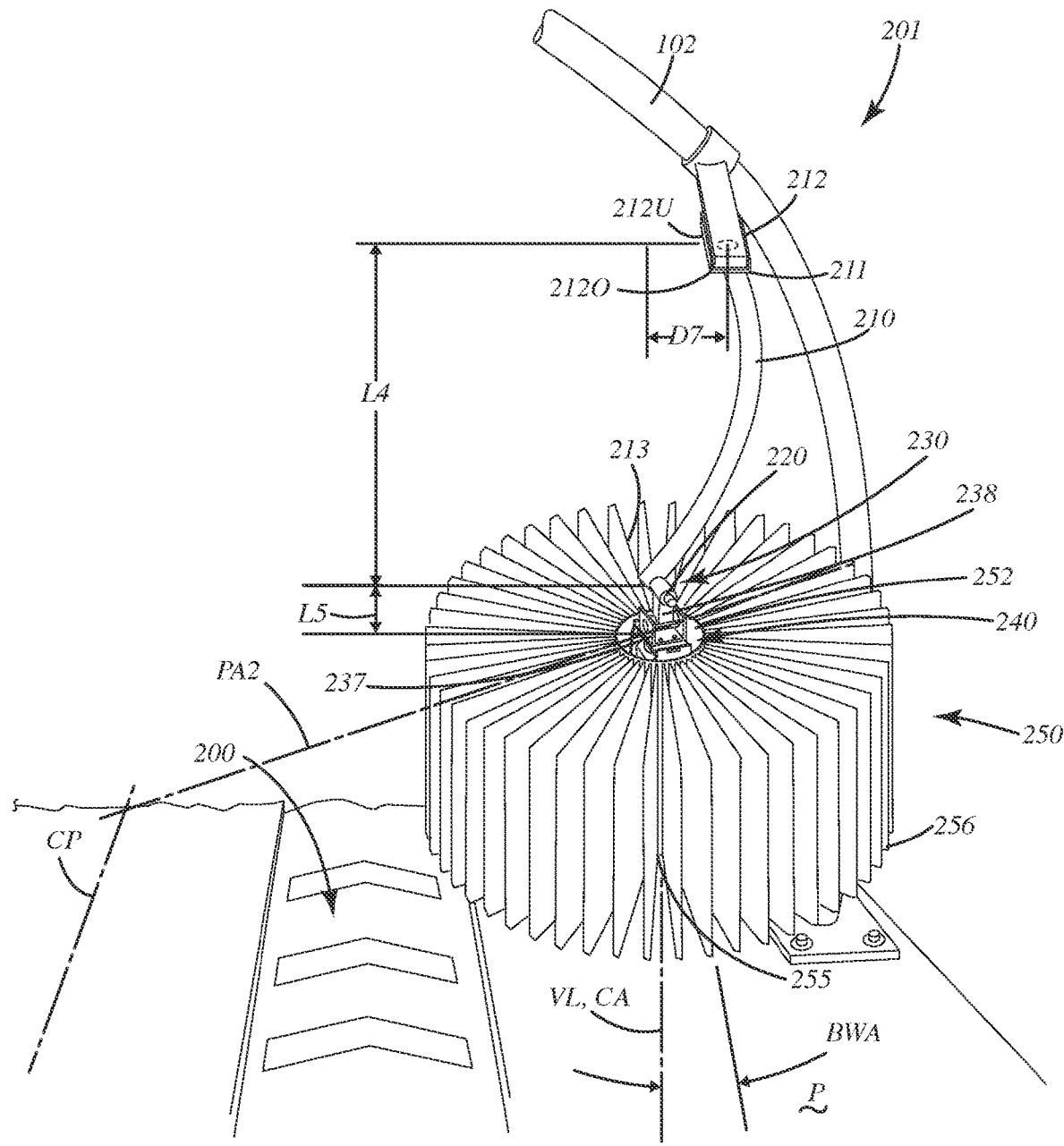
FIG. 8 is a perspective view of an alternative embodiment of a pendulum rocker brush assembly.

As shown in FIGS. 8-10, the rotatable coupler 230 can include a coupling surface 234, similar to that described in the embodiment above, to which the motor assembly 240 can be mounted. This coupling surface can be in the form of a plate that can be bolted with fasteners to the motor assembly so that the motor assembly is suspended under the plate, hanging downward below the rocker arm 210 and the coupler 230. The motor assembly 240, rocker head 250 and all the components thereof can be freely suspended from the coupler, without any part thereof supporting the structures from the ground surface. In this case, everything can hang freely under the force of gravity below the coupler, and can swing about the first pivot axis PA1 and/or the second pivot axis PA2 described below, when engaged by the vehicle V.

The rotatable coupler 230 of this embodiment, however, also optionally can include another component to provide yet another degree and/or range of movement to allow the rocker brush 250 under the rocker arm 210 to breakaway or move relative to the vehicle by swinging, flexing, moving or reorienting about or relative to a second or secondary pivot axis PA2 associated with the rotatable coupler 230. This additional component as shown in FIGS. 9-10 can include or be in the form of a breakaway pin 237 joining the coupling surface 234 with a connector 238 that is joined with the bushing 230P. The breakaway pin 237 can lay along and can be coincident with the second pivot axis PA2. Optionally, the coupling surface 234 (and anything attached to it, such as the motor assembly and brush head) thus can be rotatable or moveable about that second pivot axis PA2, as well as the first pivot axis PA1 described above. In this manner, the motor assembly 240 and the brush head 250 can move in multiple directions depending on the forces exerted on the brush head by the vehicle V traveling along the pathway 200.

It will be appreciated that the associated dynamic movement of the brush head and motor assembly, via the second range of motion provided by the breakaway pin and components associated with the bushing 230P, can provide an extra level of control over the engagement of the brush head with the vehicle V moving along the pathway 200. As an example, for particularly wide vehicles, such as large trucks with dual rear wheels, the breakaway components of the rotatable coupler 230 can allow the brush head 250 to be moved away from the vehicle by optionally 1 inch to 6 inches, inclusive, 2 inches to 4 inches, inclusive or about 3 inches when the brush head rotates or moves about the second pivot axis PA2. This can prevent damage to the assembly and the vehicle alike. This can result in fewer claims by users of the car wash in which the rocker assembly is installed. In addition, with opposing brush assemblies, shown in FIG. 12, disposed on opposite passenger P and driver D sides of the pathway 200, the movement of each of the brush assemblies can provide extra clearance on both sides of the vehicle V. Again, this can be useful with particularly wide vehicles being cleaned by the rocker assemblies 201.

The breakaway pin 237 as mentioned above can be associated with and/or provide a second pivot axis PA2. As shown in FIG. 10, the second pivot axis PA2 can be aligned with other components and axes of the rocker assembly 201, which as shown there, is on the passenger side P of the pathway 200. For example, the second pivot axis PA2 can extend at a breakaway angle BA relative to the conveyor direction CD and/or relative to the center line CP of the vehicle pathway 200. This breakaway angle BA can be optionally between 30 degrees and 160 degrees, inclusive, between 45 degrees and 135 degrees, inclusive, between 90 degrees and 120 degrees, inclusive, or about 120 degrees. This angle BA can be selected to allow the brush head 250 and the associated bristles 256 to swing in directions B1 or B2, or generally away from the vehicle when the vehicle engages the brush head with excessive force, for example, when the vehicle is disproportionately large relative to the vehicle pathway 200. This in turn can allow the brush head 250 and motor assembly 240 to swivel and/or move appropriately away from the surfaces of the vehicle V to avoid damage to the equipment and/or the vehicle. Of course, in cases where the rotatable coupler 230 further includes the projection and pivot bushing, the brush head 250 and motor assembly 240 also can move in a secondary and/or additional direction Cl, pivoting about the first pivot axis PA1 through a swing angle SA as described below.

As further shown in FIG. 10, the second pivot axis PA2 also can be disposed at an angle A3 relative to the first pivot axis PAL This angle A3 can be optionally 0 degrees to 180 degrees, inclusive, 45 degrees to 135 degrees, inclusive, 60 degrees to 120 degrees, inclusive, or about 90 degrees, depending on the application and the suitable movement of the brush head and motor assembly relative to the rocker arm 210. As also shown in FIGS. 9 and 10, the respective projection, in the form of a coupler pin 220, and the breakaway pin 237, can likewise be disposed at similar angles. In some cases, the breakaway pin and coupler pin can be transverse and optionally perpendicular to one another in the construction.

With reference to FIGS. 8-10, the rotatable coupler 230 can include a connector 238 that joins the breakaway pin 237 with the pivot bushing 230P. The connector 238 can be in the form of a solid bracket, but optionally can include another swivel, pivoting element or joint associated with it. The connector 238 can be in the form of a simple tubular element that is welded or permanently fixed to the pivot bushing 230P and the secondary bushing 239 within which the breakaway pin 237 can be rotatably disposed. Each of the pins 220 and 237 can be secured within the respective bushings via a respective fastener, clip, pin, flange, weldment, nut or other component. With further reference to FIG. 9, the secondary bushing 239 and breakaway pin 237 can be further joined with the coupling surface 234. This coupling surface 234 can be identical to the coupling surface above and can be configured with mounting components, such as holes or studs, to mount the motor assembly 240 to that coupling surface 234 and thus to the coupler 230.

Turning now to the motor assembly 240, that assembly 240 can be substantially identical to the motor assembly 140 as described in the embodiment above. Suffice it to say that it can have the appropriate motor 242 disposed in a motor body 248 with a motor shaft 244 extending therefrom. The shaft can rotate about the brush bore axis CA. The motor assembly 240 also can include a connector plate 246 that can be secured to the distal end 255 of a brush core 252. That brush core 252, also sometimes referred to as a central support member, as shown, can be in the form of a cylindrical barrel. Of course, other shapes and dimensions can be utilized for this brush core 252. The brush core 252 can be constructed from a metal, composite, polymer or combinations thereof. The core can include one or more attachment elements or flanges 248F on its exterior. The individual bristles 256 can be secured to those flanges 248F and thus to the brush core 252. The brush core 252 can define an internal bore 248B which extends along the central axis or core axis CA, which can be coincident with the central axis of the motor assembly 240 and the shaft 244 of the motor assembly.

Optionally, the brush core 252 can include a lower wall or plate 255, which can form a distal end of the core and the brush head in general. The motor assembly 240 can include a similar motor assembly lower plate 246. These plates 246 and 255 can be joined with one another, optionally using fasteners or other components, which can be modifiable so that the brush core and thus the bristles can be removed and/or replaced relative to the motor assembly and vice versa. Optionally, the lower plate 255 can be considered the distal end of the brush head 250 disposed at the lowermost point of the hard components thereof, excluding the bristles 256 of the brush head 250.

As shown in FIGS. 8-9, the motor assembly 240 optionally can be disposed within the brush core 252. In this manner, the motor assembly, and its respective structural and electrical components and bearings can be partially or fully shielded from high pressure sprays that occur around the rocker brush assembly 201 within the car wash. In turn, this can increase the longevity and function of the motor assembly, reducing maintenance and repair activities to keep the motor assembly in good operation. In some cases, the upper rim or uppermost edge of the brush core 252 is disposed above the motor of the motor assembly, and/or the majority of the motor assembly itself. The bore 248B can be of a first diameter D9 while the motor assembly 240 can be of a second dimension D10, which is the greatest width or other dimension of the motor assembly. The dimension D9 of the bore 248B can be greater than the dimension D10 such that the motor assembly 240 can fit within the bore 248B and still allow the brush core 252 and its side walls to rotate at relatively high speeds around the body 242 and the motor 248 of the motor assembly 240. The shaft 244 and plate 246 of the motor assembly 240 as mentioned above can be fixedly secured to the distal end 255 of the brush core 252, and disposed inside the bore.

The brush core 252 and the motor assembly 240 housed within it optionally can be disposed a distance L5 below the lower or second end 213 of the rocker arm 210. The distance L5 can be selected so that it is relatively minimal and effectively lowers the vertical location of the motor assembly and brush core. This in turn can provide clearance relative to the vehicle on the vehicle pathway 200 above the lower end 213 of the rocker arm 230, for example, for mirrors and other structures that may project outwardly and laterally away from a vehicle V travelling on the pathway 200. The distance L5 can be optionally less than 18 inches, less than 12 inches, less than 6 inches or other distances from the second end 213 of the rocker arm 210.

As mentioned above, the brush core 252 can be joined with one or more bristles 256 that extend outward from the axis CA, generally about the exterior surface of the brush core 252. These bristles can be identical to that of the current embodiment above and can be in the various forms explained in connection with bristles in general in that embodiment, and therefore will not be described again here. Suffice to say that the bristles can be flexible. Accordingly, they can be sometimes weighed down by the force of gravity so that each of the flexible bristles is substantially vertical, that is, at least ¼ of the length of each flexible bristle can hang downward in a substantially vertical manner when the brush assembly is not powered. However, when the brush assembly is powered, due to the rotational forces, the flexible bristles can begin to extend more radially outward from the core axis CA, which can correspond to an axis of rotation for the core and the respective bristles. In doing so, the flexible bristles 256 can attain a substantially horizontal orientation in which at least ¼ of the length of each flexible bristle can become generally horizontal or slightly angled relative to horizontal while spinning about the axis CA. The other features and characteristics of the bristles 256 can be similar or identical to that of the bristles 156 described in the embodiment above.

The brush core 252, as well as the bristles 256 of the brush head 250, the motor assembly 240 and its components can generally move, swing and/or reorient with one another as a common unit due to their attachment to the coupler surface 234 of the coupler 230. Movement of the various components of the rocker brush assembly 201 during a car wash operation can be further understood with reference to FIGS. 11 and 12. As with the embodiment above, the rocker brush head 250, brush core 252 and motor assembly 240 can move via the rotatable coupler 230 and in particular, about the first pivot axis PA1 to a swing angle SA with regard to a vertical reference line VL, which can initially be coincident with the axis CA before any swinging or movement. The vertical reference line VL can be a generally vertical line, orthogonal to the pathway 200. The swing angle SA can be optionally at least 5 degrees, at least 10 degrees, at least 15 degrees, between 10 and 45 degrees, inclusive, between 10 and 20 degrees, inclusive, between 10 and 15 degrees, inclusive, or about 15 degrees, depending on the application.

Optionally, when the brush head 250 and distal ends 255 of the brush assemblies 201 move to the respective swing angles SA, those components move to the positions shown in broken lines, for example 250' and 255' shown in FIG. 12. In so doing, those components move a distance D12 from their initial positions and locations. As an example, the distance D12 from the vertical reference line VL to the distal end 255' (which can align with the moved axis CA' at the swing angle SA) can be optionally at least 3 inches, at least 6 inches, at least 10 inches, at least 20 inches, at least 30 inches, between 6 and 20 inches, inclusive, between 10 and 20 inches, inclusive, between 3 and 12 inches, inclusive, between 3 and 6 inches, inclusive, about 12.5 inches, about 6 inches, or about 3 inches. The bristles 256 attached to the brush core 252 when it moves to the swing angle SA also can be laterally displaced that distance D12 as well as other components that swing.

Optionally, the motor assembly 240, brush head 250, and brush core 252 along with the distal end 255 can move along a second pathway, by itself or simultaneously with movement of these components through the swing angle SA. In particular, the components can swing through a secondary swing angle BWA when pivoting about the second pivot axis or breakaway axis PA2. This secondary swing angle BWA can be offset from the vertical reference line VL, as shown in FIG. 8. There, the secondary swing angle BWA can be optionally at least 5 degrees, at least 10 degrees, at least 15 degrees, between 10 and 45 degrees, inclusive, between 10 and 20 degrees, inclusive, between 10 and 15 degrees, inclusive, or about 15 degrees, depending on the application. In moving through this secondary swing angle BWA, the brush head 250 can generally move away from surfaces of the vehicle as mentioned above. Optionally, in moving through the secondary swing angle BWA, the distal end 255 and the ends of the bristles 256 can move a distance that is similar or identical to the distance D12 described above. Further optionally, the brush head 250 as well as the motor assembly, brush core and other components such as the bristles can all move simultaneously through the swing angle SA and through the secondary swing of BWA in a dynamic motion. In other cases, the components can move through the swing angle SA alone, through the secondary swing angle BWA alone, or through portions of each of these swing angles together or alone.

As shown in FIG. 11, the rocker assemblies 201 can move similar or identical to the embodiments 100 above. For example, the rocker arms 210 of rocker assemblies on opposite sides of the vehicle pathway 200 can be disposed on a rocker axis RA4 that is perpendicular to the center line CP of the pathway 200. The rocker arms 210 in each of the passenger side P and driver side D rocker assemblies can remain on this rocker axis RA4, in a generally fixed vertical orientation, aligned with the above-described vertical reference line VL. The rocker arms 210 can remain in this orientation while the rotatable coupler 230 enables swinging of the brush head 250, the brush core 252 and the motor assembly 240 as well as all of the components thereof through the swing angle SA and/or the secondary swing angle BWA, in which these components swing outward from the conveyor belts on opposite sides of the pathway 200. The lower distal ends 255 of each of the brush heads can move forward in direction F, and slightly outward in a compound movement toward a second rocker axis RA5 after the brush heads swing their respective swing angles SA and/or secondary swing angles BWA, which can depend on the contact with the vehicle on opposite sides of the pathway. The second rocker axis RA5 can be disposed in a forward direction F of the first rocker axis upon such swinging. While the lower distal ends 255 may be moved to a position along this second rocker axis RA5, the portion of the motor assemblies 240, brush core 252 and components thereof can be disposed at the respective swing angles SA and/or BWA, and the bristles 256 can likewise rotate about the axis CA, tilted to the swing angles SA and/or BWA. The rocker assemblies 201 also optionally can be disposed at least partially outward from the respective conveyors or paths on opposite sides of the center line CP, and can remain in this lateral position relative to the pathway throughout their operation, as the brush heads engage the vehicle and rotate in the noted clockwise C and counterclockwise CC directions.

After the vehicle passes the brush assemblies 201, the components that moved, for example the brush heads, motor assemblies, brush cores etc., can move back to their original orientations relative to the vertical reference line VL, and in doing so move through the respective swing angles SA and BWA under the force of gravity, optionally without input from a bias element or spring. In some cases, the rocker brush assemblies can be powered off, in which case the bristles 256 of the brush head 250 can return to their first orientation where they can hang substantially vertical as described herein. The process and operation of using the brush assemblies can be repeated for multiple vehicles.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with the embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of the features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A pendulum rocker brush assembly for use in a vehicle wash, including a vehicle pathway along which a vehicle being washed moves and a support structure extending above the vehicle pathway, the pendulum rocker brush assembly comprising:

a fixed coupler fixedly joined with the support structure in an immovable manner;

a rocker arm having a first end and a second end, the first end joined with the fixed coupler, the rocker arm extending downward from the first end to the second end in a fixed, static orientation and laterally offset from a center of the vehicle pathway along which the vehicle moves in a conveyor direction, the first end being disposed an offset distance farther away from the center of the vehicle pathway than the second end;

a rotatable coupler joined with the second end of the rocker arm, the rotatable coupler including a pivot bushing defining an aperture and a projection rotatably joined with the pivot bushing, the rotatable coupler including a first pivot axis transverse to the conveyor direction, the rotatable coupler including a coupling surface, the coupling surface free to rotate in an unbiased manner about the first pivot axis;

a motor assembly joined with the coupling surface, the motor assembly including a motor and a motor shaft, the motor assembly suspended by gravity below the coupling surface; and a rocker brush head including a brush core joined with the motor shaft and extending in a vertical orientation along a core axis, and a plurality of flexible bristles joined with the brush core, wherein the motor assembly rotatably actuates the rocker brush head when the motor is powered so that the plurality of flexible bristles transition from a first orientation to a second orientation, wherein the rocker brush head and the motor assembly joined with the coupling surface are operable to pivot about the first pivot axis to a swing angle between 10 degrees and 30 degrees, inclusive, relative to a vertical reference line, when the rocker brush head rotates and encounters an opposing force from the vehicle moving along the vehicle pathway in the conveyor direction;

wherein the rocker arm extends along a curvilinear axis from the first end to the second end.

2. The assembly of claim 1, wherein the first orientation of the flexible bristles is substantially vertical, and wherein the second orientation of the flexible bristles is substantially horizontal.

3. The assembly of claim 1, wherein the brush core includes a central bore, wherein the motor and the motor shaft are disposed inside the central bore, wherein the motor is shielded from a sprayed liquid along the vehicle pathway due to the position of the motor inside the central bore.

4. The assembly of claim 1,
wherein the rocker brush head and the motor assembly pivot about the pivot bushing to the swing angle,
wherein the swing angle is between 5 degrees and 30 degrees, inclusive.

5. The assembly of claim 1 comprising:
a breakaway pin joined with the rotatable coupler and including a second pivot axis that extends at a breakaway angle between 45 degrees and 135 degrees, inclusive, relative to the conveyor direction,
wherein the breakaway pin is distal from the projection,
wherein the motor assembly is pivotable about the second pivot axis to allow the motor assembly and the rocker brush head to move away from the vehicle moving along the vehicle pathway in the conveyor direction.

6. The assembly of claim 1,
wherein the rotatable coupler includes a breakaway pin joining the coupling surface with a connector that is joined with the pivot bushing,
wherein the breakaway pin includes a second pivot axis,
wherein the coupling surface is rotatable about the first pivot axis and the second pivot axis simultaneously.

7. The assembly of claim 1,
wherein the motor assembly is disposed inside the brush core, and
wherein the motor assembly is shielded from a liquid sprayed on the vehicle.

8. The assembly of claim 1,
wherein the rocker arm remains in the static orientation as the brush core swings out the swing angle between 10 degrees and 20 degrees, inclusive, in a forward direction about the first pivot axis so that the rocker brush head does not damage a surface of the vehicle.

9. The assembly of claim 1,
wherein the curvilinear axis lays along a circle having at least one radius,
wherein the curvilinear axis curves away from the vehicle pathway,
whereby the rocker arm extending along the curvilinear axis is configured to provide clearance for a mirror of the vehicle projecting from the vehicle as the vehicle moves along the vehicle pathway.

10. The assembly of claim 9,
wherein the at least one radius is 1 foot to 8 feet, inclusive.

11. A pendulum rocker brush assembly for use in a vehicle wash, including a vehicle pathway along which a vehicle being washed moves and a support structure extending above the vehicle pathway, the pendulum rocker brush assembly comprising:
a fixed coupler fixedly joined with the support structure in an immovable manner;
a rocker arm extending between a first end and a lower, second end, the first end fixedly joined with the fixed coupler so that the rocker arm projects downward in a vertical orientation and is laterally offset from the vehicle pathway along which the vehicle moves in a conveyor direction, the lower, second end being disposed closer to the vehicle pathway than the first end;
a rotatable coupler joined with the second end of the rocker arm, the rotatable coupler including a pivot bushing defining an aperture and a projection rotatably disposed in the aperture, the rotatable coupler including a first pivot axis, the rotatable coupler including a coupling surface, the coupling surface free to rotate in an unbiased manner about the first pivot axis;
a motor assembly fixedly joined with the coupling surface, the motor assembly including a motor and a motor shaft, the motor assembly suspended by gravity below the coupling surface; and
a rocker brush head including a brush core joined with the motor shaft, the brush core including a brush core axis and a plurality of flexible bristles joined with the brush core,
wherein the motor rotatably actuates the rocker brush head when the motor is powered so that the plurality of flexible bristles move from a first orientation to a different, second orientation,
wherein the rocker brush head and the motor assembly joined with the coupling surface are pivotable about the first pivot axis from a substantially vertical orientation, where the brush core axis is substantially vertical, to a deployed orientation where the brush core axis is disposed at a swing angle of between 5 degrees and 30 degrees, inclusive, from vertical, when the rocker brush head rotates and engages the vehicle moving along the vehicle pathway in the conveyor direction;
wherein the rocker arm extends along a curvilinear axis from the first end to the lower, second end,
wherein the curvilinear axis lays along a circle having at least one radius,
wherein the at least one radius is 1 foot to 8 feet, inclusive,
wherein the curvilinear axis curves away from the vehicle pathway,
whereby the rocker arm extending along the curvilinear axis is configured to provide clearance for a mirror of the vehicle projecting from the vehicle as the vehicle moves along the vehicle pathway.

12. The assembly of claim 11,
wherein the brush core houses the motor assembly therein, and
wherein the motor assembly is shielded from a liquid sprayed on the vehicle.

13. The assembly of claim 11,
wherein the brush core is disposed less than 18 inches from the lower, second end of the rocker arm to a lower vertical location of the motor assembly and thereby provide clearance relative to the vehicle on the vehicle pathway.

14. The assembly of claim 13,
wherein the rocker arm remains in the vertical orientation as the brush core swings out the swing angle of between 5 degrees and 30 degrees, inclusive, from vertical, in a forward direction about the first pivot axis so that the rocker brush head does not damage a surface of the vehicle.

15. The assembly of claim 11, comprising:
a breakaway pin joined with the rotatable coupler and including a second pivot axis that extends at a breakaway angle between 45 degrees and 135 degrees, inclusive, relative to the conveyor direction,
wherein the breakaway pin is distal from the projection,
wherein the motor assembly is pivotable about the second pivot axis through a secondary pivot angle to allow the motor assembly and the rocker brush head to move away from the vehicle moving along the vehicle pathway in the conveyor direction.

16. A pendulum rocker brush assembly for use in a vehicle wash, including a vehicle pathway along which a vehicle being washed moves and a support structure extending above the vehicle pathway, the pendulum rocker brush assembly comprising:

a rocker arm having a first end and a second end, the rocker arm fixedly joined with and suspended by the support structure at the first end, the rocker arm extending downward from the first end to the second end in a fixed, static orientation;

a motor assembly including a motor and a motor shaft, the motor assembly being rotatably joined with the rocker arm adjacent the second end of the rocker arm in an unbiased manner; and a rocker brush head joined with the motor shaft, wherein the rocker brush head and the motor assembly are configured to pivot outward, when the rocker brush head encounters an opposing force due to the vehicle moving along a conveyor direction, to a swing angle between 10 degrees and 30 degrees, inclusive, offset from a vertical reference line;

wherein the rocker arm is curved and extends along a curvilinear axis from the first end to the second end.

17. The assembly of claim 16, wherein the rocker brush head and the motor assembly are pivotable about a first pivot axis from a vertical orientation to the swing angle between 5 degrees and 30 degrees, inclusive.

18. The assembly of claim 16, comprising:

a second pivot axis that extends at a breakaway angle between 45 degrees and 135 degrees, inclusive, relative to the conveyor direction, wherein the motor assembly is pivotable about the second pivot axis to allow the motor assembly and the rocker brush head to move away from the vehicle moving along the vehicle pathway in the conveyor direction.

19. The assembly of claim 16, wherein the curvilinear axis lays along a circle having at least one radius, wherein the curvilinear axis curves away from the vehicle pathway, whereby the rocker arm extending along the curvilinear axis is configured to provide clearance for a mirror of the vehicle projecting from the vehicle as the vehicle moves along the vehicle pathway.

20. The assembly of claim 19, wherein the at least one radius is 1 foot to 8 feet, inclusive.

* * * * *